June 4, 1963 R. L. HOWARD ETAL 3,092,825
CODING APPARATUS
Filed Dec. 5, 1961 2 Sheets-Sheet 1

Robert L. Howard
Rudolph B. Thorness
John R. Winckler
INVENTORS

BY Louis Sheldon
ATTORNEY

June 4, 1963   R. L. HOWARD ETAL   3,092,825
CODING APPARATUS
Filed Dec. 5, 1961   2 Sheets-Sheet 2

Robert L. Howard
Rudolph B. Thorness
John R. Winckler
INVENTORS

BY  *Louis Sheldon*
ATTORNEY

United States Patent Office 3,092,825
Patented June 4, 1963

3,092,825
CODING APPARATUS
Robert L. Howard, White Bear Lake, and Rudolph B. Thorness and John R. Winckler, Minneapolis, Minn., assignors, by mesne assignments, to the United States of America as represented by the Secretary of the Navy
Filed Dec. 5, 1961, Ser. No. 157,284
6 Claims. (Cl. 340—353)

This invention relates to coding apparatus and is concerned more particularly with improvements in a coded rotor of the 011 and cycle type applicable to telemetering and recording of data such as ambient atmospheric pressure.

An object of the invention is to provide a coded rotor from which accurate unambiguous data may be obtained.

Further objects and advantages of the invention will appear as the description proceeds.

The invention will be better understood on reference to the following description and the accompanying drawing, wherein.

Figure 1:
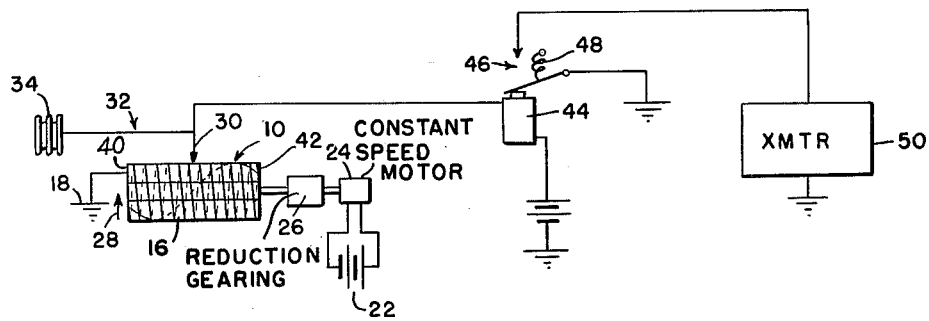
FIG. 1 is an elevational schematic view of a coding assembly including a rotor coded in accordance with the invention.
Figure 2:
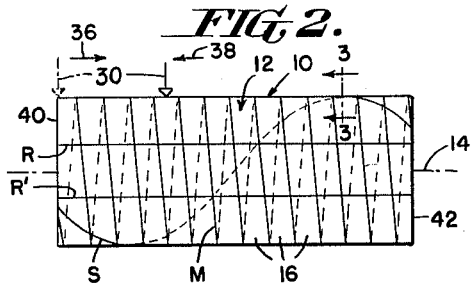
FIG. 2 is an enlarged elevational view of the rotor.
Figure 3:
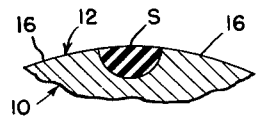
FIG. 3 is an enlarged sectional view taken as indicated at 3—3 in FIG. 2.
Figure 4:
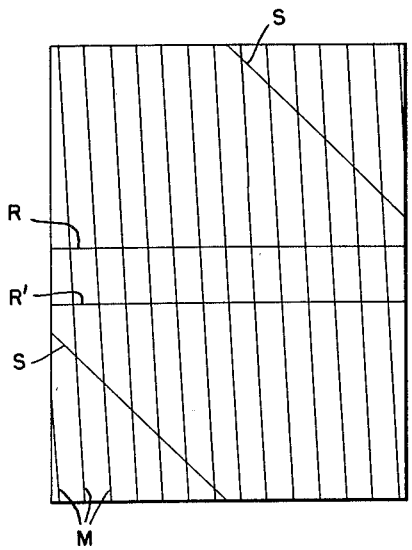
FIG. 4 is a development of the rotor.

Referring now more particularly to the drawing, disclosing an illustrative embodiment of the invention, there is shown at 10 a rotor in the form of a small cylinder whose entire outer cylindrical surface 12 is polished smooth and is made up of electrically conductive and non-conductive areas. The rotor 10 may be formed of an insulation body formed with grooves inlaid with filar strips of metal, or of a metal body formed with grooves inlaid with filar strips of insulation. Assuming the latter construction for illustration, the non-conductive area consists of a "single-turn" helix line S, a multi-turn helix line M, and two reference lines R and R' near each other and parallel to the rotor axis 14, and the conductive area consists of the remaining discrete portions 16 of the surface 12, said portions being metallic and grounded at 18. The purpose of using two reference lines instead of one appears hereinafter.

A battery 22 energizes a constant speed motor 24 which, through reduction gearing 26, drives the rotor 10 at, say, 1 r.p.m. in the direction 28.

A lightly spring pressed contactor arm or pointer 30, forming part of an aneroid bellows instrument 32, is connected to a linear bellows 34 and has a point contact engaging the rotor surface 12 and arranged to move in a shallow arc which is nearly parallel to the rotor axis 14 and in the general direction 36 in response to decrease in ambient atmospheric pressure and in the opposite direction 38 in response to increase in ambient atmospheric pressure. The high (or ground, or sea level) and low pressure ends of the rotor 10 are indicated at 40 and 42, respectively.

The pressure information signals obtained from engagement of the pointer 30 with the rotor 10 may be taken directly from an associated relay circuit and recorded on a suitable chart recorder, or it may be used to modulate a radio transmitter for telemetering purposes.

Referring to FIG. 1, when the pointer 30 is engaged with a rotor area 16, the relay 44 is energized and holds the relay switch 46 open, so that no pulse ensues. On each engagement of the pointer 30 with an insulation line, the solenoid 44 is deenergized and the spring 48 closes the switch 46, whereupon the transmitter 50 produces a pulse which, through suitable instrumentalities (not shown), actuates a recorder pen (not shown) to produce a pip on a paper strip 52 moving at constant speed in the direction 54. For convenience the pips reflecting engagement of the pointer 30 with the lines R, R', S, and M are designated respectively r, r', s, and m. The pips r and r', being always equidistant and formed at regular intervals along the strip 52, serve as reference marks, and the distance between successive pips r (or between successive pips r') is the reference interval, indicated at I in FIG. 5. Either the pips r or the pips r' should be used as the starting points for all reference intervals on the strip 52 for obtaining pressure pip displacements. With certain exceptions, noted below, the reference pips r are so used in the following description.

In each cycle of the rotor 10, the pointer 30 separately engages the reference lines R and R' and the helices S and M, on occasion may engage the helix M and one or the other of the reference lines at crossovers therewith, and on occasion may engage the helices at their crossovers. If the equipment is carried by a high altitude balloon, for example, the pulses resulting in the production of pips s are produced at progressively increasing phase angles relative to the corresponding preceding pulses resulting in the production of pips r as the balloon soars, at progressively decreasing phase angles as the balloon descends, and at uniform phase angle while the balloon is at ceiling or other constant altitude. The pulses resulting in the production of pips m will produce a family of pips m for each turn of the multi-turn helix M. If, in any cycle of the rotor 10, only three pips appear, one of them will be a merger of a pip m with a pip s, representing a crossover of the helix M with the helix S, or a merger of a pip m with a referene pip, reflecting a crossover of the helix M with a reference line R or R'.

The displacement of the pointer 30 along its path from its initial (i.e., ground pressure) position (at the end 40 of the rotor surface 12) to its position on the rotor surface at the time of contact of the pointer with the helix S (or M) is related to the atmospheric pressure ambient to the bellows 34 at the time at which such contact occurs. If the pointer displacement from the rotor end 40 could be measured to the desired degree of accuracy, the ambient pressure corresponding to such displacement could be readily determined from a graph of pointer displacement versus pressure previously plotted from calibration of the bellows instrument 32 in a bell jar. Such accuracy is not feasible, however, unless the rotor and bellows are made much larger than is desirable. Moreover, where a permanent record is desired, either nearby, or at a remote place where a radio receiver is stationed, the value of the desired pressure and with the desired accuracy can be readily obtained from the reference and pressure pips on the strip chart 52 (FIG. 5) and the use of a calibration chart 56 (shown in part in FIG. 6), as will appear.

If a rotor having only a single-turn helix S were used, one might suppose that the atmospheric pressure at which a pressure pip s would be recorded on the strip 52 could be determined with the desired accuracy merely by scaling the displacement of that pip from the next preceding reference pip r, said displacement being of course an analog of the pointer displacement from the rotor end 40 at the time of formation of the pip, and using the calibration chart 56. As noted below, such a supposition would be erroneous, especially for very low pressures (high altitudes).

A paper strip speed not substantially in excess of about 3 inches per cycle of the rotor 10 (and hence about 3 inches per minute) is desirable. Assuming a strip speed of 3 inches per minute, the reference interval (from any pip r to the next pip r) would of course be 3 inches. Using a rotor with only the one helix S, and assuming the ballon has a ceiling altitude of, say, 150,000', where the pressure is about 1 millibar, and that the 3" interval accordingly spans the pressure range from 1013 millibars (sea level pressure) to 1 millibar, it is apparent that in no case can the displacement of a pip s be scaled with sufficient nicety to obtain a value accurate within a fraction of one millibar. At the higher pressures (lower altitudes), a pressure reading accurate within one, a few, several, or in some cases many millibars will do. In many cases, however, balloons soar to and considerably above 100,000 feet. A one millibar pressure difference in the region of an altitude of 100,000 feet and upward, for example, corresponds to an altitude difference of upwards of about 2000', so that a fraction of one millibar pressure difference corresponds to a significant difference in altitude. Accordingly, for pressure differences at the more elevated altitudes this lack of sensitivity would render the helix S practically useless except to enable a coarse reading to be made from the strip 52 and calibration chart 56. Speeding up the strip 52 would not accomplish substantial improvement in accuracy.

In the past, a rotor having only a multi-turn helix has been used. With such a rotor, the ambient atmospheric pressure at which a pressure pip m would be recorded due to contact of the pointer 30 with the first turn of the multi-turn helix (from the starting end 40 of the rotor) could be determined as a function of the displacement of that pip from the next preceding reference pip r. This displacement of a pip m, if the helix M had a total of N turns, could of course be measured with N times the accuracy or sensitivity with which the displacement of a pip s for a helix S at the same pressure could be measured. However, for pressures at which the pointer 30 engaged the second or any subsequent turn of the helix M, use of only a multi-turn helix led to ambiguity. This ambiguity arose from the fact that each turn of the helix M accounts for a separate family of pressure pips m. Observing the displacement of any such pressure pip m from the next preceding reference pip r, there was no way of identifying the particular turn (of the helix M) to which that pressure pip m related, and hence of identifying the family of which that pip was a member, so that there was no way of obtaining, from such displacement, an indication of the total displacement of the pointer 30 from the rotor end 40 at the recording of the pip. That is, the pip m could have the same displacement for each turn of the helix M. This confusion would not occur if only a helix S were used, because the displacement of any pressure pip s is an analog of the pointer displacement for the full pressure range; but, as noted, a helix S does not afford the desired accuracy or sensitivity of reading, particularly at the lower pressures (higher altitudes).

Using a rotor 10 with both helices S and M, ambiguity is avoided, the desired vernier or micrometer accuracy or sensitivity being obtainable with nominal strip speed. As will appear, this is accomplished by relying on the displacement of a pip s as a basis for identifying only the particular turn (of the multi-turn helix M) in which the pulse accounting for that pip s is produced, and relying on the displacement of the pip m, in the same reference interval as that pip s, as an accurate indicator of the pressure at which the pointer 30 caused the formation of that pip m.

Although, from the scaled displacements $D_s$ and $D_m$ of the pips s and m in a given reference interval I (FIG. 5) and certain simple computations, the pressure at the formation of the pip m can be ascertained with the desired accuracy, this is a laborious procedure which can be avoided by the use of a calibration chart 56 (FIG. 6) in which rotor phase displacements (ordinates) at the engagement of the pointer 30 with the helices S and M are plotted (on an enlarged scale) against pressures (abscissae), with the rotor 10 and bellows instrument 32 in a bell jar in the laboratory. Such a chart 56 will accordingly have a single s-curve intersected by a plurality of m-curves, the number of m-curves being of course equal to the number of turns in the helix M, and the horizontal lines, marked r-lines and r'-line, respectively, being the loci of the pips r and r' and thus corresponding to the reference lines R and R'. The calibration chart 56 is conveniently made 30" long, representing a pressure range of say 1013 millibars to 1 millibar, and 10" high, representing a cycle of the rotor 10. The reference interval on the strip 52 being 3", proportional dividers can be used to convert the displacements of the pips s and m from the strip to the calibration chart 56. The horizontal from the magnified ordinate corresponding to the pip displacement $D_s$ in any reference interval will, on the calibration chart 56, intersect the s-curve at a point which can be projected vertically to one, and only one, m-curve; the magnified ordinate corresponding to the pip displacement $D_m$ in the same reference interval is then projected horizontally until it intersects that m-curve, and the vertical projection of that point of intersection to the pressure scale 60 at the base of the chart 56 will give the pressure with the desired degree of accuracy.

Figure 5:
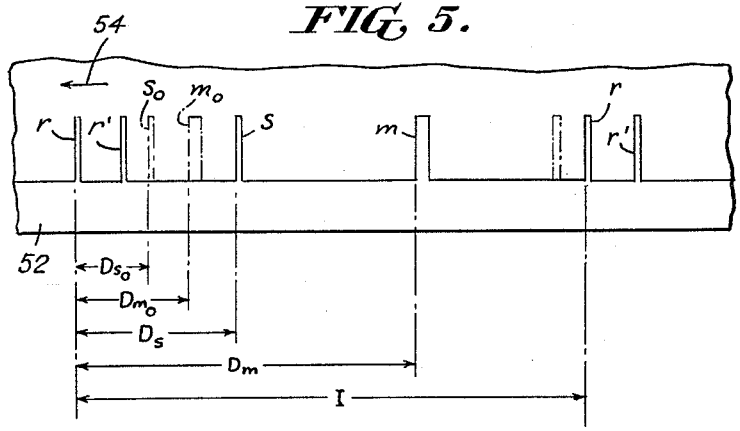
FIG. 5 depicts a portion of a strip chart showing the relative positions of pips reflecting the pulsing at the rotor in a rotor cycle (reference interval) when the aneroid bellows activated rotor contactor pointer is at the high ambient pressure end of the rotor and when the pointer is at a selected intermediate part lengthwise of the rotor.
Figure 6:
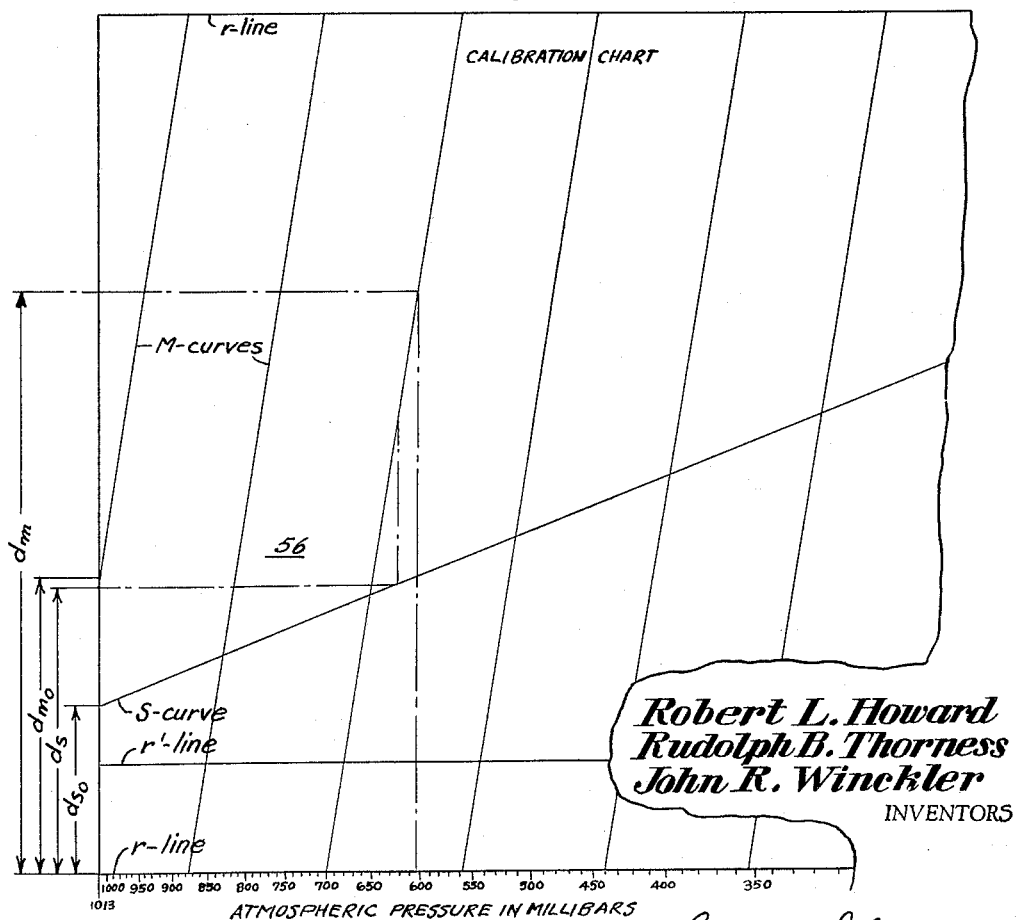
FIG. 6 shows a calibration chart for the coding assembly.

In FIG. 5, the pips $s_0$ and $m_0$ (both shown in dot-dash lines) reflect the pulses on engagement of the pointer 30 with the helices S and M, respectively, at the rotor end 40, where the pointer is located when the ambient atmospheric pressure is that of sea level, i.e., 1013 millibars. The distances $D_{s_0}$ and $D_{m_0}$ on the strip 52 are accordingly the respective displacements of pips $s_0$ and $m_0$. When the proportional magnifications of these displacements are applied to the chart 56, where the respective distances are designated $d_{s_0}$ and $d_{s_m}$, it is apparent that the pressure is 1013 millibars.

In FIG. 5, the pips s and m (both shown in full lines) reflect the pulses on engagement of the pointer 30, at an intermediate pressure position, with the helices S and M, respectively. The distances $D_s$ and $D_m$ on the strip 52 are the respective displacements of the pips s and m. The corresponding distances on the chart 56 are indicated at $d_s$ and $d_m$. The horizontal line distant $d_s$ from the r-line on the chart 56 intersects the s-curve at $X_s$. The only m-curve intersected by the vertical line passing through the point $X_s$ is indicated at Y. The horizontal line distant $d_m$ from the r-line intersects the m-curve Y at the point $Y_m$. A vertical line from the point $Y_m$ to the pressure scale 60 at the base of the chart 56 will give, with the desired accuracy, the pressure at which the pip m was formed.

Due to radio noise, slow recorder instrument response, backlash, grit, and/or possibly other factors, there may be a lack of distinct contact resolution which limits the accuracy with which a pip reflects such contact. The number of turns in the helix M is chosen in accordance with the degree of uncertainty of the location of the point in the pip s to which its displacement is to be scaled in each reference interval. Using a rotor 10 running at 1 r.p.m. and having a diameter of 1" and a length of 2⁵⁄₁₆", and a helix S having a line width of 0.030", a helix M having a line width of 0.020", and reference lines 0.045" wide and 45° apart, and running the strip 52 at 3" per minute, the pips have been found empirically to be accurate within a maximum of ±0.035 of the reference interval, so that the range of uncertainty was 0.070 of the reference interval. For measurements of altitude increments on the order of a few hundred feet at an elevation on the order of 100,000 ft. (10 mb. pressure), a 10-turn helix M was found to afford a satisfactory degree of sensibility. At substantially and progressively higher elevations (lower pressures) the 10-turn helix M was found to provide less than desired sensibility for like altitude increments, but a 14-turn helix M proved satisfactory even at elevations in the region of 150,000 ft.

Assuming a rotor 10 running 1 r.p.m. and coded as specified above, with the helix M having 14 turns, and a strip 52 having a speed of 3" per minute are preferred for the purpose of the invention, and neglecting radio noise etc., and assuming the pointer 30 is stationary when traversed by any line, it follows that: each reference pip $r$ and $r'$ will have substantially the same width (0.045"); each pip $s$ will be about 0.04" wide; each pip $m$ will be about 0.28" wide; the space between adjacent reference pips will be about 0.35" wide; and the minimum space between a pip $s$ and a reference pip will be slightly greater than the width of a pip $m$. The pips $r$ and $r'$, being always near each other and the same width and the same distance apart, said distance being nearly ⅛ of the reference interval, and each pip $s$ necessarily being spaced from the reference pips and between a pip $r$ and the next pip $r'$ (in the same reference interval), the pips $r$, $r'$, and $s$ are readily distinguished notwithstanding the fact that their widths are practically the same. The pips $m$, being substantially wider than the pips $r,r'$, and $s$, can be readily distinguished therefrom.

Since the helix S does not touch either of the reference lines R and R', no pip $s$ will ever merge with either a pip $r$ or a pip $r'$. The minimum distance of a pip $s$ from the next preceding pip $r$ or the next following pip $r'$ exceeds the width of a pip $m$, so that a pip $m$ cannot merge with both a pip $s$ and a pip $r$ or $r'$. The helix M intersects the reference lines R and R', so that a pip $m$ may on occasion merge with a pip $r$ or a pip $r'$ (but not with both in any reference interval, since the width of a pip $m$ is discernably less than the distance between adjacent pips $r$ and $r'$). If a pip $m$ merges with a pip $r'$, there is no problem, since the displacement $D_m$ is measured from the preceding pip $r$. If a pip $m$ merges with a pip $r$, and the distance from such pip $m$ to the next preceding pip $r$ is less than the reference interval I, here, again, there is no problem as far as that interval is concerned; and, for the next following interval, the distances of the pips $s$ and $m$ are scaled from the pip $r'$ next preceding the starting pip $r$ of such interval, and on the calibration chart 56 the corresponding magnified distances are laid off upward from the horizontal $r'$-line. It is evident, therefore, that if the rotor had only one reference line R or R', merger of a pip $m$ with a reference pip would lead to confusion, and that with two reference lines such confusion is precluded.

Obviously many modifications and variations of the invention are possible in the light of the above teachings. It is therefore to be understood that within the scope of the appended claims the invention may be practiced otherwise than as specifically described.

We claim:
1. In an electrical coding apparatus,
a constant speed rotor having a coaxial right cylindrical surface consisting of electrically conductive and electrically non-conductive types of areas,
one type constituting the bulk of the surface,
the other type consisting of reference marking and first and second helical lines,
the lines being substantially coextensive lengthwise of the surface,
the first line intersecting the second line at a plurality of points.
2. The structure of claim 1,
the reference marking consisting of two straight lines close to each other,
each straight line being substantially coextensive with the helical lines lengthwise of the surface,
the entire second helical line being disposed in the wider of the circumferential spaces defined by the straight lines,
and, measured circumferentially of the surface, the first helical line being of different width than the other lines and narrower than the narrow space between the straight lines.
3. The structure of claim 2, and, measured circumferentially of the surface, the first helical line being substantially wider than each of the other lines.
4. The structure of claim 2,
the ends of the second helical line being spaced from the straight lines,
and, measured circumferentially of the surface, the first helical line being narrower than the space between each end of the second helical line and the straight line nearest that end of the second helical line.
5. The structure of claim 4, and, measured circumferentially of the surface, the first helical line being substantially wider than the other lines.
6. The structure of claim 1, the lines winding in the same direction of rotation about the axis of the surface.

References Cited in the file of this patent
UNITED STATES PATENTS

| | | |
|---|---|---|
| Re. 20,695 | Smoot | Apr. 12, 1938 |
| 2,588,102 | Forero | Mar. 4, 1952 |
| 2,802,205 | Wong | Aug. 6, 1957 |